UNITED STATES PATENT OFFICE.

WILLIAM H. SINGER, OF ALLEGHENY CITY, PENNSYLVANIA.

IMPROVEMENT IN METHODS OF APPLYING CAST-STEEL TO ARTICLES MADE OF IRON.

Specification forming part of Letters Patent No. 85,140, dated December 22, 1868; reissue No. 4,772, dated February 27, 1872.

Specification describing Improved Method of Applying Cast-Steel to Articles of Iron or Steel, invented by WILLIAM H. SINGER, of Allegheny City, in the county of Allegheny and State of Pennsylvania.

The invention relates to the application of cast-steel to the surface of articles made of iron or soft steel. These articles are centers, facings, backs, and such analogous ones as are used in cultivators, plows, or burglar-proof safes.

The method heretofore known to the public consisted in heating the iron or soft steel, placing it hot in the mold, and pouring upon it the molten steel. The great objections which have been found in practice to this method of operation are two: first, the oxide or scale which has been formed upon the iron or soft steel, and does not fall off, is an insuperable obstacle to a perfect welding or adhesion of parts; secondly, the oxide that does come off is mixed with the cast-steel, and blisters, splits, and causes imperfections in the latter when hardened.

My process is, first, to remove the oxide by means of a diluted acid, in which the iron or soft steel is preferably immersed until the desired effect has been produced. Secondly, I remove any adhering acid by washing the iron or soft steel in lime-water. This also has the additional effect of preventing the oxidation of the metal if laid aside for future use. Thirdly, I take iron or soft steel which has been thus thoroughly cleansed, and, without heating it at all, put it into the molds and pour about it the molten steel.

By this process of effectually removing the film of incrusting oxide from the iron or soft steel, I obtain a perfect weld or adhesion between the cast metal and that upon which it is cast.

Having thus described my invention, what I claim as new, and desire to secure by Letters Patent, is—

The method of welding or applying cast-steel to iron or soft steel, as and for the purpose described.

WILLIAM H. SINGER.

Witnesses:
G. BRUCE HASTON,
ANDREW HUMBERT.